Dec. 29, 1942.  W. H. HARSTICK  2,306,804
SEPARATOR SPOUT COVER
Filed June 30, 1941

INVENTOR
WILLIAM H. HARSTICK
BY Paul O. Pippel
ATTY

Patented Dec. 29, 1942

2,306,804

UNITED STATES PATENT OFFICE 2,306,804

SEPARATOR SPOUT COVER

William H. Harstick, Richmond, Ind., assignor to International Harvester Company, a corporation of New Jersey Application June 30, 1941, Serial No. 400,544

10 Claims. (Cl. 233—1)

This invention relates to a discharge-spout construction for a separator.

It is desirable that the discharge spouts of cream separators be closed at the top so that no foreign matter may get into the streams of milk and cream flowing through the spout. A closed spout presents cleaning problems. Accordingly, it is desirable that a discharge spout be closed with a removable cover which will permit cleaning of the spout.

An object of the present invention is the provision of an improved discharge spout.

A further object is to provide an improved discharge spout for a cream separator.

Another object is the provision of a removable cover for the discharge spout of a separator.

According to the present invention, a discharge spout of a cream separator is provided with a removable cover, which is attachable to the spout by portions at one end which slidably engage flanges on the spout and by a pivotally mounted loop at the other end which embraces the end of the spout.

Figure 1:
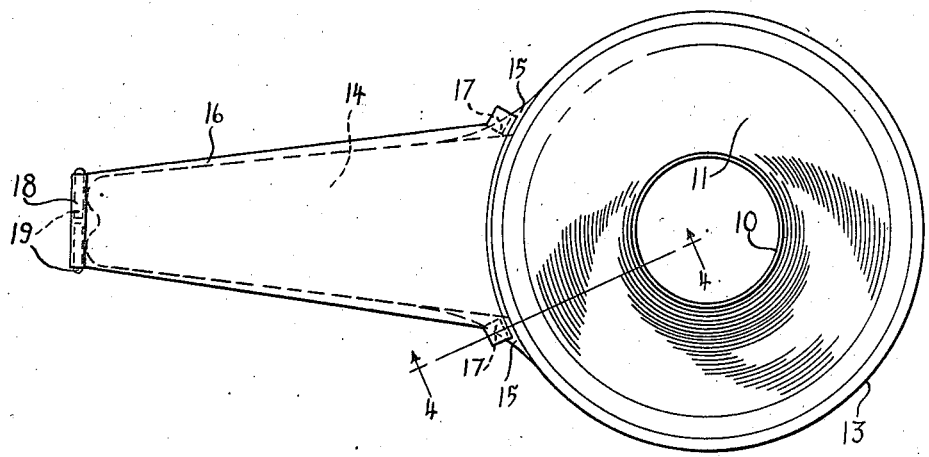
Figure 1 is a plan view of the discharge spout of the present invention attached to the milk cover of a cream separator.

The reference character 10 designates what is known as a milk cover forming part of a cream separator, not otherwise shown. For a more complete showing of the separator, reference is made to applicant's Patent No. 2,249,653, dated July 18, 1941. The milk cover 10, as shown, includes a frusto-conical disk member 11 and a ring member 12 having outwardly extending radial flanges 13. Attached to the ring member 12 is a discharge spout 14 of channel shape open at the top. A pair of flanges 15 is secured to opposite sides of the spout and to the ring member 13 beneath the upper flange 13 by soldering or welding. The flanges extend in the direction of the length of the spout 13 and parallel to the top of the spout.

A cover 16, which may be formed of flat resilient sheet metal, is placed upon the top of the spout 13. Ears 17, which are bent out of the plane of the cover 16, engage the under-side of the flanges 15 so as to hold one end of the cover on the spout 14. The other end of the cover 16 is formed into a bead 18, which receives the ends of an element 19 having the form of a loop that embraces the discharge end of the spout 14. Thus the said other end of the cover 16 is attached to the spout 14. The element 19 is pivotally mounted by its ends in the bead 18 so that it may be swung from the position of Figure 2 in which it embraces the discharge end of the spout to a position in which it is free of the spout. The end of the cover 16 is detached from the discharging end of the spout. The other end of the cover 16 is detached by being moved in the direction of the length of the spout 14 until the ears 17 are moved out of engagement with the flanges 15.

Figure 2:
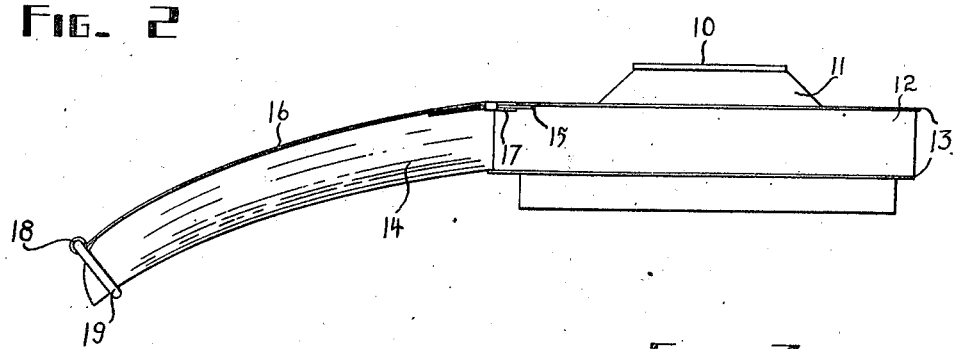
Figure 2 is a side view of the structure shown in Figure 1.
Figure 3:
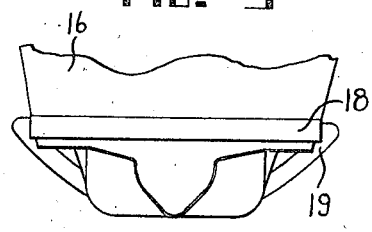
Figure 3 is an end view of the discharge spout.
Figure 4:
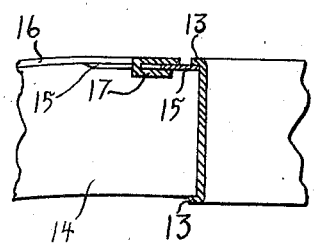
Figure 4 is a sectional view taken along lines 4—4 of Figure 1.

It will be noted from Figure 2 that the spout 14 curves downwardly so as to be convex on the top open side. Since the cover 16 is formed of resilient sheet metal, it has sufficient inherent flexibility to conform to the open top side of the spout 14. The inherent resiliency in the cover 16 makes it tend to return to its flat shape, and this tendency prevents disengagement of the loop 19 from the spout 14.

During normal operation cream or milk flows through the spout 14, and the cover 16 keeps foreign matter from getting into the stream in the spout. When the spout 14 is to be cleaned, the cover 16 is easily removed from the spout, and access is had to the spout for cleaning and inspection.

It will be apparent from the foregoing description that a new and novel discharge spout construction for a separator is provided. By this construction the spout is provided with a cover which is completely removable. The intention is to limit the invention only within the scope of the appended claims.

What is claimed is:

1. In combination, a channel-shaped discharge spout open at the top for a cream separator, a pair of flanges positioned at opposite sides of the receiving end of the spout and extending in the direction of the length thereof and parallel to the top thereof, a cover extending along the top of the discharge spout and having portions at one end engaging the flanges on the spout so as to hold the said one end of the cover in engagement with the receiving end of the spout, the portions being attachable and detachable from the flanges by movement of the cover in the direction of the length of the spout, and means connecting the other end of the cover and the discharging end of the spout and comprising an element pivotally mounted on the other end of th cover so as to be swingable from a position in which it engages the discharging end of the spout so as to hold together the said other end of the cover and the discharging end of the spout, to a position in which it is free of the spout so as to permit removal of the cover from the spout.

2. In combination, a channel-shaped discharge spout open at the top for a cream separator, a pair of flanges positioned at opposite sides of the receiving end of the spout and extending in the direction of the length thereof and parallel to the top thereof, a cover extending along the top of the discharge spout and having portions at one end engaging the flanges on the spout so as to hold the said one end of the cover in engagement with the receiving end of the spout, the portions being attachable and detachable from the flanges by movement of the cover in the direction of the length of the spout, and means connecting the other end of the cover and the discharging end of the spout and comprising an element pivotally mounted on the said other end of the cover and forming a loop swingable from a position in which it embraces the discharging end of the spout so as to hold together said other end of the cover and the discharging end of the spout, to a position in which it is free of the spout so as to permit removal of the cover from the spout.

3. In the combination specified in claim 2, the discharge spout being curved so that its open top side is convex, the cover being a sheet member possessing sufficient flexibility so as to be made to conform to the convex top side of the spout.

4. In combination, a channel-shaped discharge spout member open at the top for a cream separator, a pair of flanges positioned at opposite sides of the receiving end of the spout member and extending in the direction of the length thereof and parallel to the top thereof, a cover member extending along the top of the discharge spout member and having portions at one end engaging the flanges on the spout member so as to hold the said one end of the cover member in engagement with the receiving end of the spout member, the portions being attachable and detachable from the flanges by movement of the cover member in the direction of the length of the spout member, and means connecting the other end of the cover member and the discharging end of the spout member and comprising an element pivotally mounted on one member so as to be swingable from a position in which it engages the other member so as to hold the members together to a position in which it is free of the other member so as to permit removal of the cover member from the spout member.

5. In combination, a channel-shaped discharge spout member open at the top for a cream separator, a pair of flanges positioned at opposite sides of the receiving end of the spout member and extending in the direction of the length thereof and parallel to the top thereof, a cover member extending along the top of the discharge spout member and having portions at one end engaging the flanges on the spout member so as to hold the said one end of the cover member in engagement with the receiving end of the spout member, the portions being attachable and detachable from the flanges by movement of the cover member in the direction of the length of the spout member, and means connecting the other end of the cover member and the discharging end of the spout member and comprising an element pivotally mounted on one member and forming a loop swingable from a position in which it embraces the other member so as to hold the members together to a position in which it is free of the other member so as to permit removal of the cover from the spout.

6. In combination, a channel-shaped discharge spout open at the top and having attaching portions at its receiving end, a cover extending along the top of the discharge spout and having attaching portions at one end engaging the attaching portions on the spout so as to hold the said one end of the cover in engagement with the receiving end of the spout, the attaching portions of the cover being attachable and detachable from the attaching portions of the spout by movement of the cover in the direction of the length of the spout, and means connecting the other end of the cover and the discharging end of the spout and comprising an element pivotally mounted on the said other end of the cover and forming a loop swingable from a position in which it embraces the discharging end of the spout so as to hold together said other end of the cover and the discharging end of the spout to a position in which it is free of the spout so as to permit removal of the cover from the spout.

7. In combination, a channel-shaped discharge spout having a convex open top and having attaching portions at its receiving end, a cover extending along the top of the discharge spout and having attaching portions at one end engaging the attaching portions on the spout so as to hold the said one end of the cover in engagement with the receiving end of the spout, the attaching portions of the cover being attachable and detachable from the attaching portions of the spout by movement of the cover in the direction of the length of the spout, and means connecting the other end of the cover and the discharging end of the spout and comprising an element pivotally mounted on the said other end of the cover so as to be swingable from a position in which it engages the discharging end of the spout so as to hold together said other end of the cover and the discharging end of the spout to a position in which it is free of the spout so as to permit removal of the cover from the spout, the cover being a sheet member possessing sufficient flexibility so as to be made to conform to the convex top side of the spout and having a tendency to return to a flat shape, which tendency prevents disengagement of the element from the discharging end of the spout.

8. The combination with a channel-shaped discharge spout member having a convex open top, of a cover member extending along the top of the spout member, means connecting one end of the cover member with the receiving end of the spout member, and means connecting the other end of the cover member with the discharging end of the spout member and comprising an element pivotally mounted on one member so as to be swingable from a position in which it engages the other member so as to hold the members together to a position in which it is free of the other member so as to permit removal of the cover member from the spout member, the cover being a sheet member possessing sufficient flexibility so as to be made to conform to the convex top side of the spout member and having a tendency to return to a flat shape, which tendency prevents disengagement of the element from the said other member.

9. The combination with a channel-shaped discharge spout having a convex open top, of a cover extending along the top of the discharge spout, means connecting one end of the cover with the receiving end of the spout, and means connecting the other end of the cover with the discharging end of the spout and comprising an element pivotally mounted on the said other end of the cover so as to be swingable from a position in which it engages the discharging end of the spout so as to hold together the said other end of the cover and the discharging end of the spout to a position in which it is free of the spout so as to permit removal of the cover from the spout, the cover being a sheet member possessing sufficient flexibility so as to be made to conform to the convex top side of the spout member and having a tendency to return to a flat shape, which tendency prevents disengagement of the element from the said other member.

10. The combination with a channel-shaped discharge spout having a convex open top for a cream separator, of a cover extending along the top of the discharge spout, means connecting one end of the cover with the receiving end of the spout, and means connecting the other end of the cover with the discharging end of the spout and comprising an element pivotally mounted on the said other end of the cover and forming a loop swingable from a position in which it embraces the discharging end of the spout so as to hold together said other end of the cover and the discharging end of the spout to a position in which it is free of the spout so as to permit removal of the cover from the spout, the cover being a sheet member possessing sufficient flexibility so as to be made to conform to the convex top side of the spout and having a tendency to return to a flat shape, which tendency prevents disengagement of the loop from the discharging end of the spout.

WILLIAM H. HARSTICK.